Patented May 9, 1939

2,158,032

UNITED STATES PATENT OFFICE 2,158,032

PROCESS OF PRODUCING SYMMETRICAL THIOINDIGO DYES

Herbert August Lubs, Wilmington, Del., and Alfred J. Johnson, Woodstown, N. J., assignors to E. I. du Pont de Nemours & Company, Wilmington, Del., a corporation of Delaware No Drawing. Application June 11, 1938, Serial No. 213,190

6 Claims. (Cl. 260—331)

This invention relates to the production of thioindigo colors from the corresponding aryl thioglycolic acids.

This invention had for an object the design of an improved process for the production of thioindigo colors, the preparation of thioindigo dyes from the corresponding aryl thioglycolic acids without isolation of the intermediate products, the conversion of aromatic thioglycolic acids to thioindigo colors by economical procedures, and the preparation of bis-2:1-naphtho-thionaphthene-indigo from naphthalene-beta-thioglycolic acid in improved yields, strength, solubility, clarity of shade and brightness. A general advance in the art and other objects which will appear hereinafter are also contemplated.

It has now been discovered that thioindigo dyes of superior purity, brightness, depth of shade and greater tinctorial power may be prepared by the following series of steps.

(1) Converting the aryl thioglycolic acids (thioindigo dye intermediates) to the corresponding acid chloride in an anhydrous organic solvent (suspension medium), (2) Ring closing (without isolating the acid chloride) the same to the corresponding thioindoxyl, (3) Diluting the resultant (with water) in the presence of an alkali metal carbonate until an alkaline medium is obtained, (4) Distilling off the organic liquid utilized in the acid chloride forming reaction, (5) Converting the thioindoxyl to its soluble form, (6) Separating the insoluble components from the solution of the thioindoxyl, and (7) Oxidizing the thioindoxyl to color (dyestuff).

This procedure is illustrated by the conversion of phenyl-thioglycolic acid to the corresponding thioindigo color, the equations for the reaction involved being as follows:

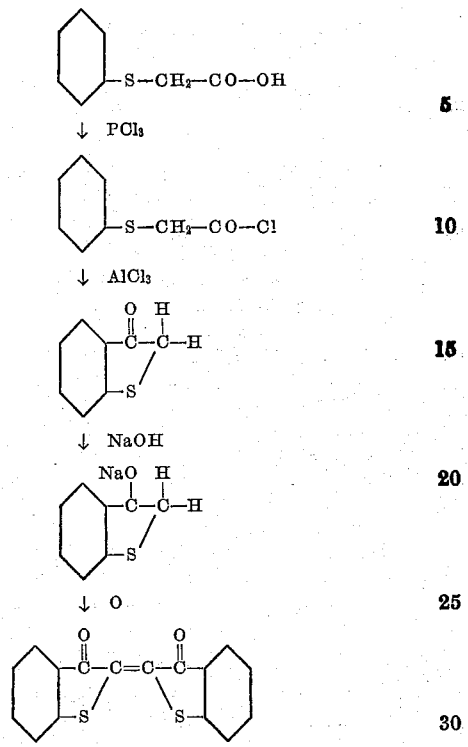

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

Naphthalene-beta-thioglycolic acid (30 parts), mono-chloro-benzene (280 parts) and phosphorus-trichloride (21 parts) were mixed and heated to 80°–90° C. The resultant mixture was held at this temperature from one to two hours, cooled to about 30° C., and anhydrous aluminum chloride (21 parts) added. The charge was heated to 60° C. and stirred at this temperature for one hour, after which it was drowned in an alkaline solution containing water (400 parts), 30% caustic soda solution (100 parts) and soda ash (10 parts). The reaction vessel was washed out with approximately a 10% solution of soda ash equivalent to 10 parts of soda ash, and the washing liquor added to the drowned charge. The resultant mixture (which at this stage should be alkaline) was steam distilled to remove the mono-chloro-benzene. The recovered mono-chloro-benzene, after being freed from water, was suitable for further use. The charge was then diluted to a volume equal to that of 1400 parts of water, and 140 parts of 30% caustic soda solution added. The temperature was adjusted to 90° C., and after adding 14 parts of magnesium oxide (to agglomerate any tar and aid mechanically in filtering), the charge was filtered through a press which was washed with an alkaline solution consisting of 80 parts water and 6 parts caustic soda solution. The resulting clarified solution was adjusted to 80°-85° C. and 96 parts of a sodium poly-sulfide solution containing 45% Na₂S₄.₅ added. The temperature was held at 80°-85° C. for one hour to completely oxidize the color, which was then filtered off and washed until the filtrate was neutral. The color obtained (bis-2:1-naphtho-thionaphthene-indigo) having the formula:

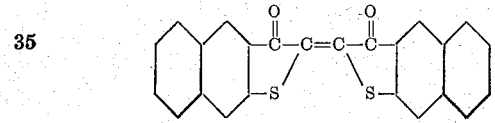

was of a high degree of purity, completely soluble in alkaline reducing vats, and dyed cellulosic materials in bright reddish shades of brown. The color was brighter, redder, and had greater tinctorial power than the same dye when produced by methods heretofore known.

So far as now appears, the process is generally applicable to naphthalene-thioglycolic acids provided they do not contain substituents which are attacked by the phosphorus-tri-halide, for example, nitro, amino, hydroxy and alkoxy radicals. As specific examples of phenyl-thioglycolic acid color intermediates to which this invention may be desirably applied, mention may be made of naphthalene-alpha-thioglycolic acid, 8-fluoro-naphthalene-1-thioglycolic acid, 8-chloro-naphthalene-1-thioglycolic acid, and 8-bromo-naphthalene-1-thioglycolic acid.

*Example II*

In a reaction vessel 2-methyl-4-chloro-phenyl-thioglycolic acid (50 parts), mono-chloro-benzene (430 parts) and phosphorus tri-chloride (35 parts) were stirred and heated at 75°-85° C. for one hour. The mixture was cooled at 20°-25° C., and anhydrous alumium chloride (35 parts) added and the mass stirred and heated at 60° C. for one hour. The reaction mass was then drowned in a solution consisting of 500 parts of water, 220 parts of 30% caustic soda solution and 12 parts soda ash. The mono-chloro-benzene was steam distilled out, and the resulting thioindoxyl suspension diluted with water to a volume equivalent to 1000 parts of water. To the resultant 150 parts of 30% caustic soda solution were added, the temperature raised to 85°-90° C., 10 parts of magnesium oxide added, and the solution clarified by filtration. The color was obtained from the filtrate by adding a solution of potassium ferricyanide until the thioindoxyl was completely oxidized. The color was isolated by filtering off and washing with water. The color (6:6'-dichloro-4:4'-dimethyl thioindigo) having the formula:

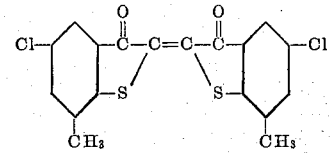

obtained by this process was redder and brighter than the same dye prepared by processes described in the prior art. So far as now appears, the process is generally applicable to aryl thioglycolic acids not containing substituents which are attacked by phosphorus tri-halides. As specific examples of aromatic thioglycolic acid color intermediates to which this invention may be desirably applied mention may be made of phenyl thioglycolic acid, 3-methyl-phenyl-thioglycolic acid, 4-methyl-phenyl-thioglycolic acid, 3-fluoro-phenyl-thioglycolic acid, 3-chloro-phenyl-thioglycolic acid, 2:5-di-methyl-phenyl-thioglycolic acid, 3:4-di-chloro-phenyl-thioglycolic acid, 2-methyl-phenyl-thioglycolic acid, 2:5-di-chloro-phenyl-thioglycolic acid, 2:4-di-chloro-3-methyl-phenyl-thioglycolic acid, and 3-bromo-phenyl-thioglycolic acid.

As is well known to those skilled in the art, and as will be apparent from Examples I and II, the phenyl-thioglycolic acid must have one position ortho to the thioglycolic acid radical free (unsubstituted) if it is to be ring closed to a thioindoxyl.

The process of this invention is especially applicable to those aryl-thioglycolic acids which are readily sulfonated and for which acid condensing agents such as sulfuric acid and chloro sulfonic acid cannot be economically used.

This invention has numerous advantages, including a reduction of time and labor, an increase in yield of the color and unusual purity of product. Separation of the aryl-thioglycolic acid halide from syrupy phosphorus compounds before the reaction with aluminum chloride is not necessary. Losses of thioindoxyl in the organic solvent are avoided by the steam distillation procedure. This also avoids the losses caused by the formation of emulsions, exposure, and extra handling. Clarification of the thioindoxyl solution just prior to the oxidation to color removes all insoluble materials, and as a result enables the formation of color having improved strength.

The invention is not limited to the use of mono-chloro-benzene as the organic solvent suspension medium, as will be apparent to those skilled in the art. Equally good results have been obtained with benzene and ortho-di-chloro-benzene. While many other organic liquids have physical properties fitting them for use in this reaction, their price is the factor frequently responsible for retarding their use on a more widespread scale.

The ratio of caustic soda to soda ash in the drowning solution can be varied over a wide range, depending upon the particular conditions encountered and the convenience of the person carrying out the reaction. The sodium hydroxide may be omitted entirely from the solution, if desired. Proportions from O(NaOH):100(Na₂CO₃)

to 95 (NaOH):5(Na₂CO₃) may be employed advantageously without reducing the quality or yield of color. Other alkali metal carbonates (for example, potassium carbonate) may be used in place of the soda ash. The presence of the carbonate causes the precipitated thioindoxyl to be in crystalline form. In the absence of the carbonate, a tarry precipitate is obtained.

The reaction between the aryl thioglycolic acid and the phosphorus trichloride in an organic solvent may be carried out at atmospheric or superatmospheric pressures. Pressures such as 10 to 15 pounds per square inch are often convenient to use and may be employed advantageously. The amount of pressure employed is limited only by the economics of the process and the strength of the materials from which the reaction vessels are fabricated.

The aluminum chloride ring closing step in the process may also be carried out under atmospheric or superatmospheric pressures. The factors governing the use of pressures in this step are the same ones which are involved in the phosphorus trichloride reaction step.

In résumé, the steps of (1) condensing (ring closing) the phenyl-thioglycolic acid halide to the corresponding thioindoxyl in the same solution in which it was formed without separation or purification, (2) drowning the ring closure reaction mass in an alkali metal hydroxide alkali metal carbonate solution and steaming distilling to recover the organic solvent from the alkaline suspension, and (3) dissolving the thioindoxyl in the resulting suspension by the addition of sodium hydroxide in water, clarifying to remove insoluble impurities, and oxidizing to form the color, are especially important in obtaining the improvements discussed above.

As many apparently widely different embodiments of this invention may be made without departing from the spirit and scope thereof, it is to be understood that we do not limit ourselves to the specific embodiments thereof except as defined in the appended claims.

We claim:

1. The process of preparing thioindigo dyes from phenyl-thioglycolic acids which comprises converting a phenyl-thioglycolic acid to the corresponding acid halide in an anhydrous suspension medium, ring closing the said acid halide to the corresponding thioindoxyl without isolation from the said suspension medium, diluting with aqueous caustic alkali containing an alkali metal carbonate until the reaction mass is faintly alkaline, distilling out the said suspension medium, solubilizing the thioindoxyl, separating the insoluble by-products and oxidizing the thioindoxyl to the dye.

2. The process which comprises ring closing a pheny-thioglycolic acid halide to the corresponding thioindoxyl with aluminum tri-chloride in an anhydrous organic solvent suspension medium, diluting with aqueous caustic alkali containing alkali metal carbonate, and steam distilling out the organic solvent suspension medium.

3. The process which comprises ring closing a phenyl-thioglycolic acid halide to the corresponding thioindoxyl with aluminum tri-chloride in an anhydrous organic solvent suspension medium, diluting with aqueous caustic alkali containing alkali metal carbonate, steam distilling out the organic solvent suspension medium, solubilizing the thioindoxyl by treatment with caustic alkali, and separating the insoluble by-products.

4. The process of preparing bis-2:1-naphthothionaphthene-indigo, which comprises converting naphthalene-beta-thioglycolic acid to the corresponding acid halide in an anhydrous suspension medium, ring closing the said acid halide to the corresponding thioindoxyl without isolation from the said suspension medium, diluting with aqueous caustic alkali containing an alkali metal carbonate until the reaction mass is faintly alkaline, distilling out the said suspension medium, solubilizing the thioindoxyl, separating the insoluble by-products and oxidizing the thioindoxyl to the dye.

5. The process which comprises ring closing a naphthalene-beta-thioglycolic acid halide to the corresponding thioindoxyl with aluminum trichloride in an anhydrous organic solvent suspension medium, diluting with aqueous caustic alkali containing alkali metal carbonate, and steam distilling out the organic solvent suspension medium.

6. The process which comprises ring closing a naphthalene-beta-thioglycolic acid halide to the corresponding thioindoxyl with aluminum trichloride in an anhydrous organic solvent suspension medium, diluting with aqueous caustic alkali containing alkali metal carbonate, steam distilling out the organic solvent suspension medium, solubilizing the thioindoxyl by treatment with caustic alkali, and separating the insoluble by-products.

HERBERT AUGUST LUBS.
ALFRED J. JOHNSON.